(No Model.)
C. H. & B. O. FRINGS.
PROCESS OF OBTAINING EXTRACTS FROM HOPS.
No. 478,508. Patented July 5, 1892.
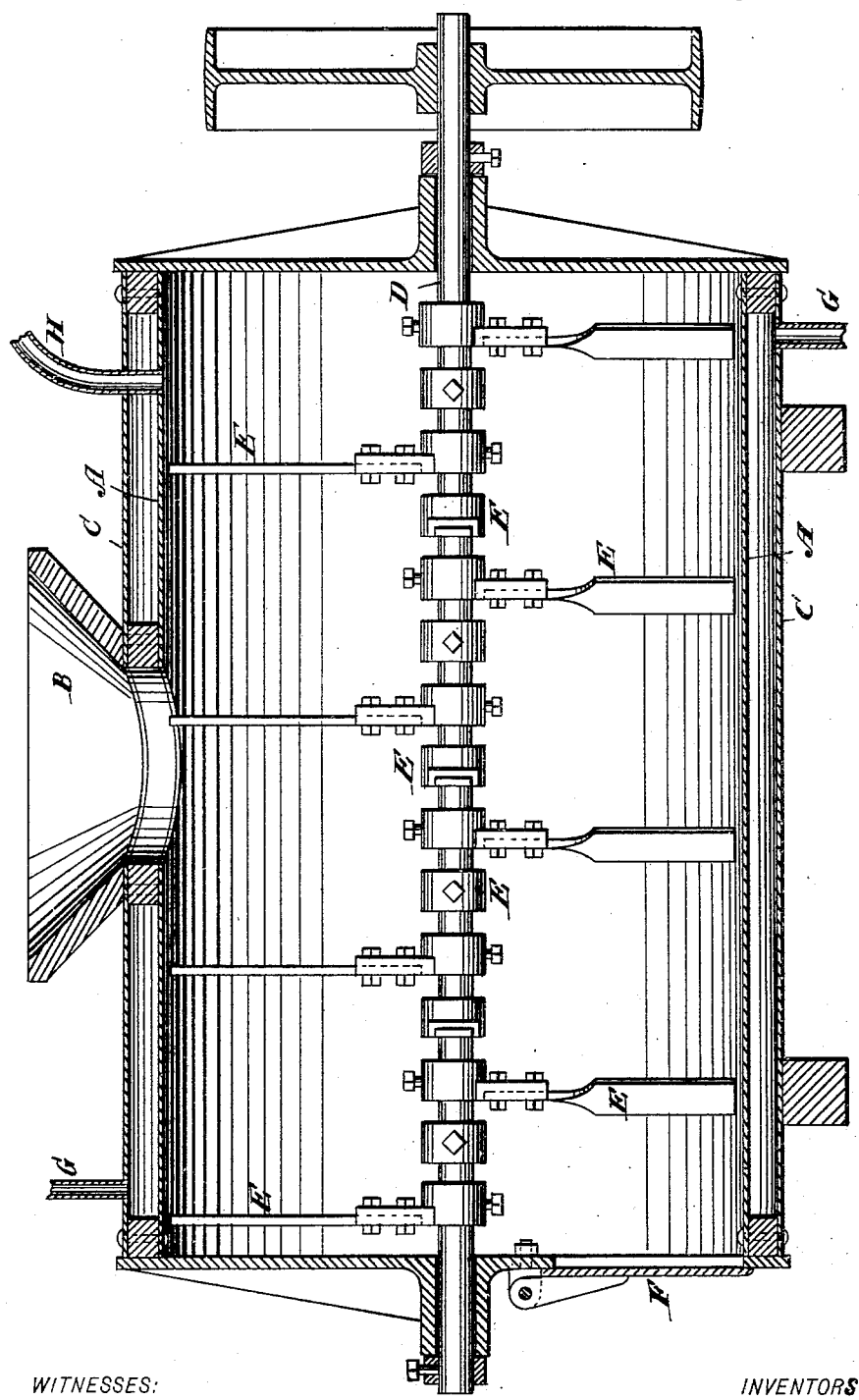
WITNESSES:
Edward Wolff
William Miller
INVENTORS:
Charles H. Frings.
Bertha O. Frings.
BY Van Santvoord & Hauff
ATTORNEYS

UNITED STATES PATENT OFFICE.

CHARLES H. FRINGS AND BERTHA O. FRINGS, OF NEW YORK, N. Y., ASSIGNORS TO THE BREWING IMPROVEMENT COMPANY, OF MAYWOOD, NEW JERSEY.

PROCESS OF OBTAINING EXTRACTS FROM HOPS.

SPECIFICATION forming part of Letters Patent No. 478,508, dated July 5, 1892.

Application filed July 16, 1891. Serial No. 399,701. (No specimens.)

*To all whom it may concern:*

Be it known that we, CHARLES H. FRINGS and BERTHA O. FRINGS, citizens of the United States, residing at New York, in the county and State of New York, have invented new and useful Improvements in the Process of Obtaining Extracts from Hops, of which the following is a specification.

The bitter principle of hops is intimately associated with different resins and therefore only sparingly soluble in cold water. Much of the said bitter principle may be extracted with boiling water or any other boiling aqueous menstruum—as, for instance, boiling beer-wort—but the resinous constituents of hops, which are extracted at the same time, will separate on cooling, thus forming a disturbing element which it is difficult to remove.

The object of our invention is to increase the solubility of the bitter principle of the hops in cold water or any other cold aqueous menstruum, and to produce a practically non-resinous extract of hops.

In carrying out our invention we torrefy the hops by subjecting them, preferably in a comminuted state, to dry heat, and then extract the hops with cold water, leaving the resinous portion thereof behind.

By torrefying hops their constituents are dissociated, the resins undergo certain changes analogous to the changes they undergo by boiling or cooking the hops, and the cells are ruptured by the emanation of gases and of a portion of the aromatic principle, so that they can be easily penetrated by cold water, to which they yield a practically non-resinous extract, possessing, besides the astringent principle, the specific aroma and bitter flavor of hops, notwithstanding that a considerable portion of the aromatic principle has been volatilized during the process of torrefaction. The dry heat required should be gradually applied and can be readily obtained by means of a steam-jacket or otherwise.

The hops (strobiles and lupulin) are placed in a suitable vessel or receptacle provided with such a steam-jacket and with a contrivance by which the hops are agitated, said vessel having an opening at the top through which the gases and vapors generated freely escape. The latter may, if desirable, be collected and the essential oil contained therein be separated.

In torrefying the hops it is preferable to apply a long-continued moderate heat—say about 212° Fahrenheit—which is gradually obtained, rather than a violent heat of short duration, by which latter heat the hops assume a dark brown color and highly empyreumatic products are formed. This dark color and these empyreumatic products may, however, be desired for certain special purposes, in which case a higher heat than 212° Fahrenheit is employed, but without singeing or injuring the hops.

The hops must be constantly agitated during the process of torrefaction, which process is finished as soon as the hops lose their adhesiveness to the touch, which can be ascertained by taking out test portions from time to time during the progress of heating. The hops are then cooled and extracted with cold water of a temperature not exceeding 50° Fahrenheit, at which temperature scarcely any resinous matter will be extracted. The water used should not show any alkaline reaction, no matter how slight, in order to prevent the dissolving of a portion of the resins.

The process of extracting the torrefied hops on a small scale may be one of the well-known processes of maceration, followed by expression, percolation, or repercolation. On a large scale the use of a diffusion- good results. The extract of hops thus obtained when intended for brewing purposes is added to the beer-wort instead of extracting the hops therein.

An apparatus useful for carrying out the process is shown in the drawing in sectional view. The vessel A has an opening B at the top, and C is a steam or water jacket. The shaft D can be made to actuate the blades or agitators E, and a door F gives access at one end to the vessel A. The water or steam enters the jacket at one of the pipes G G and leaves at the other of said pipes, and the vapors escaping from the hops pass off through pipe H and can be led through a cooling worm to be condensed, or said vapors can be otherwise disposed of.

We are aware that hops have been heated in the boiling pans or kettles in breweries and that the beer-wort has been added thereto, and we are aware that the aromatic principle or all of the volatile matter of hops has been separated therefrom by boiling, cooking, or steaming the hops, and we are also aware that the oleoresins of the hops have been extracted by treating the hops with other solvents than water. These processes are different from ours, and we do not claim them.

What we claim as new, and desire to secure by Letters Patent, is—

1. The process herein described of obtaining an extract from hops, which consists in subjecting them to the action of dry heat at a temperature of about 212° Fahrenheit and then treating the same with cold water.

2. The process herein described of obtaining an extract from hops, which consists in comminuting them, then subjecting them to the action of dry heat at a temperature of about 212° Fahrenheit, and when the required state of torrefaction has been obtained allowing the hops to cool, and then treating the same with cold water.

In testimony whereof we have hereunto set our hands in the presence of two subscribing witnesses.

CHARLES H. FRINGS.
BERTHA O. FRINGS.

Witnesses:
WM. C. HAUFF,
E. F. KASTENHUBER.